United States Patent [19]

Johnson

[11] Patent Number: 4,946,919

[45] Date of Patent: Aug. 7, 1990

[54] BORON CERAMICS FROM CARBORALATED DIACETYLENE POLYMERS

[75] Inventor: Robert E. Johnson, Hoboken, N.J.

[73] Assignee: Hoechst Celanese Corp., Somerville, N.J.

[21] Appl. No.: 273,089

[22] Filed: Nov. 18, 1988

Related U.S. Application Data

[62] Division of Ser. No. 90,999, Aug. 31, 1987, abandoned.

[51] Int. Cl.$^5$ .............................................. C08F 38/00
[52] U.S. Cl. ........................................ 526/285; 528/4; 528/5
[58] Field of Search ................... 528/4, 5; 526/285

[56] References Cited

U.S. PATENT DOCUMENTS

| | | | |
|---|---|---|---|
| 3,097,195 | 7/1963 | Kennerly et al. | 260/94.1 |
| 3,214,466 | 10/1965 | Green et al. | 528/4 |
| 3,351,616 | 11/1967 | Green et al. | 528/4 |
| 3,354,121 | 11/1967 | Knoth, Jr. et al. | 528/4 |
| 3,359,304 | 12/1967 | Bobinski et al. | 560/190 |
| 3,505,409 | 4/1970 | Bobinski et al. | 568/4 |
| 4,220,747 | 9/1980 | Preziosi et al. | 526/285 |
| 4,258,079 | 3/1981 | Economy et al. | 427/44 |
| 4,277,588 | 7/1981 | Naarmann et al. | 526/114 |
| 4,439,346 | 3/1984 | Patel et al. | 252/408.1 |
| 4,562,141 | 12/1985 | Tieke | 430/281 |
| 4,857,490 | 8/1989 | Johnson | 501/96 |

OTHER PUBLICATIONS

"Polydiacetylenes Spur Activity from Commercial to Theoretical", *Chemical and Engineering News*, May 5, 1988, pp. 33–37.

*Primary Examiner*—Melvyn I. Marquis
*Attorney, Agent, or Firm*—Depaoli & O'Brien

[57] ABSTRACT

Boron-containing ceramics are formed from organoboron preceramic polymers which are carboralated acetylenic polymers. The polymers can be formed by carboralating acetylenic or diacetylenic diols and condensing the diols to form carboralated polyesters. In an alternative process, polydiacetylene formed by the polymerization of diacetylene monomers having conjugated triple bonds are carboralated subsequent to polymerization. A process for obtaining readily soluble polydiacetylenes comprises heating a diacetylene diol in a high boiling solvent.

12 Claims, No Drawings

BORON CERAMICS FROM CARBORALATED DIACETYLENE POLYMERS

This application is a division, of application Ser. No. 090,999, filed Aug. 31, 1987 now abandoned.

FIELD OF THE INVENTION

The present invention is directed to the formation of boron-containing ceramics from organoboron preceramic polymers. The present invention is also directed to a novel method of forming boron-containing ceramics, in particular, ceramic fibers from carboralated polymers. The invention is also concerned with novel carboralated acetylenic polymers and methods of forming same.

BACKGROUND OF THE INVENTION

In the search for high performance materials, considerable interest has been focused upon carbon fibers. The terms "carbon" fibers or "carbonaceous" fibers are used herein in the generic sense and include graphite fibers as well as amorphous carbon fibers.

Industrial high performance materials of the future are projected to make substantial utilization of fiber reinforced composites, and carbon fibers theoretically have among the best properties of any fiber for use as high strength reinforcement. Among these desirable properties are corrosion and high temperature resistance, low density, high tensile strength and high modulus. During such service, the carbon fibers commonly are positioned within the continuous phase of a resinous matrix (e.g. a solid cured epoxy resin). Uses for carbon fiber reinforced composites include aerospace structural components, rocket motor casings, deep-submergence vessels, ablative materials for heat shields on re-entry vehicles, strong lightweight sports equipment, etc.

As is well known in the art, numerous processes have heretofore been proposed for the thermal conversion of organic polymeric fibrous materials (e.g. an acrylic multifilamentary tow) to a carbonaceous form while retaining the original fibrous configuration substantially intact. During commonly practiced carbon fiber formation techniques, a multifilamentary tow of substantially parallel or columnized carbon fibers is formed with the individual "rod-like" fibers lying in a closely disposed side-by-side relationship. See for instance, the following commonly assigned U.S. Pat. Nos. 3,539,295; 3,656,904; 3,723,157; 3,723,605; 3,775,520; 3,818,082; 3,844,822; 3,900,556; 3,914,393; 3,925,524; 3,954,950; and 4,020,273.

In addition to carbon fibers, there has been interest in the use of ceramic materials, including ceramic fibers for a number of high temperature, high performance applications such as gas turbines. These applications require a unique combination of properties such as high specific strength, high temperature mechanical property retention, low thermal and electrical conductivity, hardness and wear resistance, and chemical inertness.

Among the ceramic materials which have been suggested are those made from organosilicon polymers. Thus, polymers based on silicon, carbon and/or nitrogen and/or oxygen have been developed. See, for example, "Siloxanes, Silanes and Silazanes and the Preparation of Ceramics and Glasses" by Wills et al, and "Special Heat-Resisting Materials from Organometallic Polymers" by Yajima, in Ceramic Bulletin, Vol. 62, No. 8, pp. 893-915 (1983), and the references cited therein.

Other metallic polymers have been suggested as ceramic precursers. Thus, U.S. Pat. No. 4,581,468 forms boron nitride by pyrolyzing B-triamino-N-tris(trialkylsilyl)borazines. U.S. Pat. No. 4,097,294 suggests that a boron carbide ceramic is obtainable from a carborane carbon polymer.

The formation of aluminum nitride fibers is disclosed in commonly assigned, U.S. Pat. No. 4,687,657. Aluminum nitride ceramics are formed by thermal conversion of poly-N-alkyliminoalanes. Ceramics comprising silicon carbide and aluminum nitride solid solutions are also disclosed. These ceramic alloys are formed by thermal conversion of a mixture of an organosilicon preceramic polymer and the above-mentioned aluminum-containing polymer. Moreover, many recent patents describe specific silicon-containing preceramic polymers which are formed into silicon carbide and/or nitride upon thermal treatment.

Alternatively, ceramic fibers such as metal carbide fibers have been formed by incorporating inorganic metallic compounds into a carbon fiber product, the precarbonaceous polymer forming solution, the polymer spinning solution or the polymer fiber subsequent to spinning, and converting the metallic compounds in situ to metal carbides upon thermal conversion. In these methods, the precarbonaceous polymer acts as the source of carbon.

Important ceramics formed by such method are boron carbide and boron carbide-containing carbon fibers. The addition of boron carbide to carbon fiber is known to increase fiber strength and, more particularly, to substantially increase the thermo-oxidative stability of carbon fibers such that the boron carbide-containing carbon fibers can withstand higher temperature environments than carbon fibers. Methods of incorporating boron into carbon fibers to form boron carbide fibers have typically involved treating the carbon fibers with gaseous boron halides or impregnation with soluble borane salts or boric oxides including boric acid, metallic borates and organic borates, e.g. alkyl and aryl borates. Upon being treated with the boron compounds, the fibers are heated to initiate reaction of boron with the carbon fibers to yield boron carbide.

In commonly assigned, copending application U.S. Ser. No. 082,761, filed Aug. 7, 1987, now U.S. Pat. No. 4,832,895, May 23, 1989 boron-containing fibers are provided by forming a blend of a boron-containing polymer and a precarbonaceous polymer, shaping the blend into a fiber such as by spinning and pyrolyzing to form a boron ceramic fiber. Preferably, the boron-containing polymers are prepared by the condensation of boranes with Lewis bases. Such polymers are well known and prepared by condensing a borane such as diborane, pentaborane or decaborane with Lewis bases such as amines, amides, isocyanates, nitriles and phosphines. A particularly preferred borane-containing polymer is one formed by the condensation of decaborane and dimethylformamide (DMF). The borane-Lewis base condensation polymers are known and described, for example, in POLYMER LETTERS, Vol. 2, pp. 987-989 (1964); Chemical Society (London) Spec. Publ. No. 15 (1961), "Types of Polymer Combination among the Non-metallic Elements", Anton B. Burg, pp. 17-31; U.S. Pat. Nos. 2,925,440; 3,025,326; 3,035,949; 3,071,552; and British Patent No. 912,530. Other borane-containing polymers suggested include those disclosed in U.S. Pat. No. 3,441,389 wherein borane polymers are prepared by heating a compound of the formula $(RAH_3)_2 B_{10}H_{10}$ or $(RAH_3)_2 B_{12}H_{12}$ at a temperature of 200°–400° C. for several hours. Moreover, borazines such as disclosed in U.S. Pat. No. 4,581,468 and carborane polymers such as suggested in U.S. Pat. No. 4,097,294 are also considered useful.

The use of organometallic polymers as precursors for ceramic materials is advantageous in the formation of ceramic fibers. It is considerably easier to spin the polymeric materials than inorganic precursors composed of inorganic metallic particles dispersed in a spinnable organic matrix. It would, therefore, be desirable to find new organometallic polymers and methods of making same which can be used as ceramic precursors. The present invention is concerned with preparing organoboron polymers which can serve as precursors for boron ceramics such as boron carbide and boron nitride and ultimately to the formation of fibers of these boron-containing ceramic materials.

One difficulty in preparing boron-containing ceramics from organic precursers is the inability to incorporate sufficient boron into the organic polymer and react with the carbon components to form boron carbide, $B_4C$. Methods of incorporating boron-containing salts or boron-containing inorganic powders and the like into precarbonaceous polymer solutions, solids, or the formed carbon articles have proved unsuccessful in providing sufficient amounts of boron to yield improved boron carbide-containing ceramic materials. The boron-containing polymers as described in the aforementioned commonly assigned, co-pending applications have yielded boron carbide ceramics containing greater than 40% boron. There is, however, a continuing need to find additional preceramic organoboron polymeric materials which yield ceramics containing increased levels of boron.

As described previously, decaborane-containing polymers such as those produced by the reaction of decaborane with a Lewis base are known. Additionally, organoborane polymers have been produced by polymerizing difunctional carboralated acetylene monomers such as by condensation.

Carborane which is a compound of carbon, hydrogen and boron has the empirical formula $C_2H_{12}B_{10}$. While there is some difference of opinion as to the molecular structure of carborane, its stability is usually attributed to a basket-shaped molecular configuration in which the 10 boron atoms and 2 carbon atoms are arranged at the apices of an icosahedron. The following formula has been proposed wherein the circle indicates generalized, delocalized pi-bonding between the carbon and boron atoms.

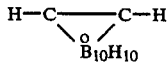

The carboralated monomers have been prepared by first reacting decaborane with an electron-donor compound, e.g., acetonitrile, to form a coordination compound, e.g. $(CH_3CN)_2B_{10}H_{12}$, bis-(acetonitrilo) decaborane. The coordination compound is then reacted with a compound having acetylenic unsaturation to form a carborane derivative. A method of forming polyester carboranes is disclosed in U.S. Pat. No. 3,351,616. Other patents disclosing carborane compounds include U.S. Pat. Nos. 3,217,031; 3,247,256; 3,254,117; 3,234,288; 3,359,304; and 3,505,409; all of which are herein incorporated by reference. The boron-containing compounds and polymers disclosed in the aforementioned patents are used primarily as high energy fuels such as for rocket propellants.

It is also known to prepare a biscarborane by reacting diacetylene with bis(acetonitrile) decaborane to carboralate one of the acetylenic bonds and additionally reacting with bis(acetonitrile) decaborane to carboralate the second acetylenic bond. As far as is known, the carboralated acetylenic including diacetylenic compounds and polymers as above-described have not previously been suggested as precursers for boron-containing ceramic materials.

SUMMARY OF THE INVENTION

In accordance with the present invention, a novel method is provided for preparing boron-containing ceramic materials from organoboron preceramic polymers. The organoboron polymers useful in this invention as ceramic precursors are carboralated polymers which have been formed by carboralating monomeric or polymeric materials which contain acetylenic bonds.

As discussed previously, one of the difficulties of forming boron-containing ceramics, in particular, boron carbide, from organic precursors is the inability to provide the precursor with a sufficient boron content capable of yielding the desired boron carbide upon pyrolyzation of the precursor to the ceramic form. It would be advantageous therefor to provide a preceramic organoboron polymer with a high degree of carboralation. This is achieved in the present invention by carboralating an alkyne- or diyne-diol and forming polymers, e.g., polyesters, through condensation or, by carboralating a polymer which contains acetylenic bonds. The carboralated acetylenic polymers of this invention contain carborane groups along the backbone thereof.

In the first aspect of the present invention, boron ceramics are obtained by pyrolysis of organoboron preceramic polymers which are formed by polymerizing difunctional carboralated acetylenic monomers. It has been suggested to form boron-containing ceramics from carborane polymers as described in U.S. Pat. No. 4,097,294. Such polymers are known and are prepared by a multi-step process in which a carborane unit is functionalized with polymerizable groups such as halogen, siloxy, hydroxy, or carboxy groups and the difunctionalized carborane subsequently polymerized. In such a process, carboralation is achieved by reacting a Lewis base-derivatized decaborane with acetylene. It would be easier and, thus, preferable to directly carboralate acetylene monomer which contains difunctional, e.g. polymerizable, groups on opposite ends of the triple bond. Unfortunately, it is not possible to carboralate such an acetylene monomer since many of the polymerizable groups such as hydroxy or carboxy are electron withdrawing and adversely affect the reactivity of the acetylenic bond for decaborane.

Thus, in accordance with the first aspect of the invention, organoboron preceramic polymers are provided from difunctional acetylenic monomers which contain at least one carbon spacer between the acetylenic carbons and the electron withdrawing polymerizable groups so as to insure carboralation of the triple bond. Such an acetylenic monomer has the formula: $ZZ'C\equiv CZ'Z$ wherein $Z'$ is a hydrocarbon or substituted hydrocarbon group containing 1 to 10 carbon atoms and $Z$ comprises a polymerizable group, for example, hydroxy, carboxy, siloxy, etc. A particularly preferred carbon spacer is $-C\equiv C-$ to provide a diyne-diol monomer. Such a monomer contains conjugated triple bonds. Although only one of these triple bonds can be carboralted, upon polymerization such as by condensation of the diol with another reactive compound, the polymer which is formed contains a backbone of repeating units of carborane and an unreacted acetylenic bond which can provide a means for functionalizing the polymer in a variety of known ways.

Alternatively, in accordance with this invention, an acetylenic polymer is formed which contains a plurality of acetylenic bonds along the backbone which are subsequently carboralated. Polydiacetylenes are the preferred polymers which are carboralated. These polymers are obtained from monomers containing conjugated triple bonds and are polymerized to provide a polymeric backbone of conjugated triple and double bonds. Carboralation of the triple bonds provides a novel preceramic organoboron polymer.

One problem in using polydiacetylene as a reactant for carboralation is the difficulty in dissolving the polymer. Often, polydiacetylene is formed by polymerizing the diacetylene monomer on the solid state to yield solid, intractable polymers. Thus, in another aspect of the present invention, a method of producing polydiacetylene which can be readily carboralated in solution is provided. In accordance with this aspect of the present invention, polydiacetylene is formed by heating simple derivatives of diacetylen-diol monomers in high boiling solvents which results in the polymerization of the monomer. The polymers which are formed are of relatively low molecular weight but can be readily dissolved in conventional solvents and can therefor be carboralated in solution with decaborane.

Processing of the carboralated diacetylene polymers of this invention into preceramic articles such as fibers is improved by blending the lower molecular weight organoboron preceramic polymers with a carbon-forming polymer such as polyacrylonitrile prior to spinning.

Pyrolysis of the organoboron polymer in selective atmospheres yields the desired ceramic. For example, pyrolysis in argon or diborane yeilds boron carbiode as a product while pyrolysis in ammonia results in boron nitride.

DETAILED DESCRIPTION OF THE INVENTION

The carboralation of an acetylenic bond is well known and is achieved by the reaction of a decaborane derivative with a compound having acetylenic unsuration. The decaborane derivative is one formed by reaction of decaborane with an electron-donor compound, E.G., Lewis base. Useful Lewis bases incude ammonia, primary and secondary amines and diamines, and nitriles and dinitriles which react with decaborane to form the derivative with the evolution of hydrogen. The reaction with ammonia takes place at 120° C. and is well known in the art. Similar bonding occurs with monoamines as, for example, methylamine, ethylamine, n-propylamine, isopropylamine, n-butylamine, isobutylamine, sec-butylamine, tert-butylamine, n-amylamine, isoamylamine, 2-aminopentane, inter alia. As secondary amines dimethylamine, diethylamine, di-n-propylamine, diisopropylamine, di-n-butylamine, dissobutylamine, and di-sec-butylamine may be given as examples. Diamines include, for example, ethylenediamine, propylenediamine, tri-methylenediamine, 1,3-diaminobutane, 1,4-butanediamine, 1,5-pentanediamine, hexamethylendiamine, and octamethylenediamine. As nitriles and dinitriles, acetonitrile, propionitrile, cyanogen, malononitrile, succionitrile, gultaronitrile, adiponitrile and B,B'-oxydipropionitrile can be mentioned as examples.

As a preferred example of these derivatives, the coordination compounds of decaborane and acetonitrile may be mentioned. Acetonitrile, on refluxing with decaborane, forms a product of $(CH_3CN)_2B_{10}H_{12}$, with hydrogen being evolved as a byproduct. The bis(acetonitrilo) decaborane compound is particularly convenient because of the unexpected ease with which acetonitrile is displaced almost quantitatively in the coupling of the decaborane group to an acetylenic bond. Another Lewis base which has been used to form coordinated compounds with decaborane is dimethylsulfide to yield dimethylsulfido decaborane.

The reaction between the acetylenic bond and the decaborane derivative proceeds conveniently by refluxing the reactants in a hydrocarbon solvent such as benzene, xylene, or toluene.

While decaborane is the preferred boron source in view of the high boron content of the compound, other boranes and substituted boranes may be used in the practice of this invention. Such compounds include diborane, triborane, tetraborane, pentaborane, hexaborane, decaborane, and substituted and di-substituted derivatives thereof including alkyl, cyloalkyl, aryl, and alkyl-aryl derivatives.

The carboralated polymers useful in this invention as precursors for boron-containing ceramics ceramics can be formed by several methods. In one method, a compound containing acetylenic unsaturation and further containing one or more polymerizable functional groups is carboralated and the carboralated compound is then subsequently polymerized. In another method, a polymer containing in the backbone thereof acetylenic unsaturation is carboralated at the acetylenic bonds.

In the first method, the Lewis base-decaborane derivative, e.g., bis(acetonitrile) decaborane, $(CH_3CN)_2B_{10}H_{12}$, is reacted with a compound having acetylenic unsaturation to form a carborane derivative:

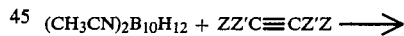 $(CH_3CN)_2B_{10}H_{12} + ZZ'C\equiv CZ'Z \longrightarrow$

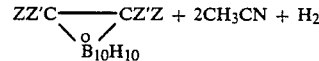 $ZZ'C\underset{B_{10}H_{10}}{\underset{\diagdown o \diagup}{\rule{1cm}{0.4pt}}}CZ'Z + 2CH_3CN + H_2$ wherein Z' is a hydrocarbon group containing 1 to 10 carbon atoms, preferably akylene, and Z can be any of a very wide variety of polymerizable groups. Preferably, Z is -OR or -COOR wherein R is for example, alkyl, aryl, acyl, or silyl. Although it is possible for R to be hydrogen, it is not recommended inasmuch as the hydrogen is reactive towards decaborane and thus, would adversely affect the carboralation reaction. Thus, in accordance with this invention carboranyl polyols and polyacids can be formed and used in making polyesters by condensation with other carboranyl or noncarboranyl polyols and polyacids. Prior to condensation, the R groups are preferably hydrolyzed by conventional means.

The carboranyl radical or radicals of the present polymers may be in either the alcohol residue of the polyester or the acid residue of the polyester or both. It has been found that in general any carboranyl glycol may be reacted with a polycarboxylic acid, with may or may not itself contain a carbonyl radical, to form the present polymers. Similarly, it has been found that in general any carbonanyl dicarboxylic acid may be reacted with a glycol, which may or may not contain a carboranyl radical, to form the polymers. Anhydrides and acyl chlorides of the dicarboxylic acids disclosed herein can also be used in place of the free acids in making the present polymers.

The carboranyl glycols can be reacted with dicarboxylic acids containing no carboranyl radical to produce polyester polymers according to the invention. Such acids include maleic, fumaric, adipic, sebacie, succinic, azelaic, glutaric, phthalic, terephthalic, tetrahydrophthalic, tetrachlorophthalic and perflurorglutaric acids. Anhydrides, acyl chlorides and esters of such acids may also be used, such as phthalic anhydride, methyl succinic anhydride, succinyl chloride, adipyl chloride and siccinic acid esters. Aliphatic acids having from 3 to 10 carbon atoms are preferred.

In a similar manner the carboranyl dicarboxylic acids may be reacted with glycols, particularly alkylene glycols such as ethylene, proplylene, and butylene glycols, or diglycols to form condensation polymers according to the invention. Also carboranyl glycols such as those disclosed above can be condensed with the carboranyl acids such as those disclosed above to form condensation polymers having an eespecially high boron content.

The carboranyl gylcols and dicarboxylic acids can also be reacted to form condensation polymers with sulfates, phosphates, borates, titanates, silicones, etc.

Polymerization of the boron-containing diols and diacids can be carried out by techniques conventional in the art for diol-diacid condensations, e.g., heating at reflux temperature to drive off water for a period sufficient to form a condensation polymer. The condensation can be catalyzed by acid catalysts known to the art, e.g., p-toluene sulfonic acid and Lewis acid type catalyst such as zinc chloride and aluminum chloride. Or, the reaction may be uncatalyzed and proceed by simple heating or by bubbling an inert gas, such as nitrogen or argon, through the reactants. The reaction proceeds in solvent or in bulk. Condensation polymers having molecular weights within the range 500 to 5,000 or higher are readily obtained.

In some cases, as for example where both carboxyl groups of the diacid are attached to the same carbon atom, polymerization of the diol and diacid is desirably effected by ester interchange in known manner.

A description of polymerizing carboranyl polyols and polyacids is set forth in aforementioned U.S. Pat. Nos. 3,234,288; 3,351,616; and 3,359,304.

The acetylenic monomer may contain one or more acetylenic bonds. However, not all of the acetvlenic bonds of the monomer may be carboralated inasmuch as electron withdrawing groups in the proximity of the acetylenic bond may greatly reduce the reactivity of the acetylenic bond for decaborane. Thus, a spacer group such as Z' is necessary to shield the acetylenic bond from any electron withdrawing groups such as the polymerizable diols and diacyls or other acetylenic bond. Monomers containing nonconjugated triple bonds can be fully carboralated. It should be noted, however, that the required spacer group needed to separate the electron withdrawing capacity of the other proximate triple bond increases the carbon content of the ceramic upon pyrolyzation of the polymer.

A novel preceramic organoboron polymer prepared in accordance with this invention is one containing a mixture of carborane and unreacted acetylenic bonds in the backbone thereof. This polymer is useful as a preceramic material in view of te boron content and the ability to tailor the polymer by adding functionality to the noncarboralated triple bond such as, for example, halogenation, crosslinking, etc. A preferred difunctional acetylenic compound useful in forming organoboron preceramic polymers in accordance with this invention is one which contains conjugated triple bonds such that Z' is a —C≡C—Z" group wherein in Z" is a hydrocarbon containing one to ten carbon atoms. An example of such a difunctional diyne is 2,4-hexadiyne-1,6-diacetate which when carboralated as described above results in a carboralated monomer of 4,5-carboryl-2-hexyne-1,6-diacetate. This carboralated monomer after acid hydrolysis leaves the corresponding diol and as a diol can be condensed as described above to form polyesters, polyethers, etc.

An alternative method of forming carboralated preceramic polymers in accordance with this invention comprises carboralating a polymer containing acetylenic unsaturation by reaction with the Lewis base-decaborane derivative as above described. Such polymers can be formed by reacting difunctional acetylenic monomers such as acetylenic diols and dicarboxylic acids to form polyesters. Upon formation of the polymer, the acetylenic bonds are then carboralated.

It would be advantageous to provide a polymer which contains a great number of acetylenic bonds in the backbone thereof relative to the molecular weight of the polymer. Accordingly, a preferred acetylenic polymer useful in this invention is poly(diacetylene).

The diacetylene monomer may be seen to possess at least two acetylenic bonds, at least two of which acetylenic bonds are in conjugation one with another.

Diacetylenes which are suitable monomers for polymerization conform to the general formula:

$R_1—C≡C—C≡C—R_2$ where $R_1$ and $R_2$ may be the same or different and may comprise alkyl, aryl, alkaryl, or aralkyl groups having from one to about 50 carbon atoms. $R_1$ and $R_2$ may, in addition, have heteroatomic substitutions or unsaturations. Thus, $R_1$ or $R_2$ may include one or more ester, acid, alcohol, phenol, amine, amide, halogen, sulfonyl, sulfoxyl, sulfinyl, silyl, siloxyl, phosphoro, phosphato, keto, aldehydo, or other moieties. In addition, metal modifications of any of the foregoing may be included such as, for example, acid or phenolate salt. In addition, $R_1$ or $R_2$ or both may be ester, acid, alcohol, phenol, amine, amide, halogen, sulfonyl, sulfoxyl, silyl, siloxyl, phosphoro, phosphato, keto, aldehydo or a metal salt or phenolate. In short, it is contemplated that any diacetylene may be suitable for use in the invention with the exception of those diacetylenes wherein $R_1$ or $R_2$ or both are hydrogen. The latter compositions are not suitable due to the fact that they are, in general, explosive.

It is to be understood that the species referred to in this description of the invention may be either straight chain, cyclic, aromatic, or branched. It should also be understood that reference to diacetylenes does not foreclose the presence of additional acetylenic bonds therein. Thus, compositions having 3, 4, or more acetylenic bonds are foreseen as long as at least two or more of such bonds are in conjugation one with another. Furthermore, additional sites of unsaturation may be present such as carbon-carbon, carbon-oxygen, carbon-nitrogen, or other double bonds, aromatic or heteroaroomatic species. Substitution with halogens, hydroxyls, amines, thiols, silyls, siloxyls, phosphates, sulfates, sulfonates, or other functionalities is also useful.

Exemplary syntheses of diacetylenes are presented in "Synthesis of N-(nitrophenyl)amine Substituted Diacetylene Monomers", Garito et al, *Makromolecular Chemie* (in press); "Synthesis of Chiral Diacetylene Polymers", Garito et al, *Makromolecular Chemie* (in press); "The Chemistry of Diacetylenes", Keter Pub. House, Jerusalem (1974); Synthesis of Nitrophenoxymethyl Substituted Diacetylene Monomers", Kalyanaraman, Garito et al, *Makromolecular Chemie*, vol. 180, Jun. 1979: "Solid-State Synthesis and Properties of the Polydiacetylenes", Baughman et al, *Annals of NY Academy of Science*, vol. 313, (1978); "Polymerization of Diacetylene Carbonic Acid Monolayers at the Gas-Water Interface," Day et al, *J. Polymer Sciences, Polymer Letters*, ed. vol. 16, p. 205 (1978); and U.S. Pat. No. 3,923,622 issued to Baughman et al.

Polydiacetylenes exhibit fully conjugated backbones with a potentially unlimited variety of side chain substituents. The polymer can be depicted as follows:

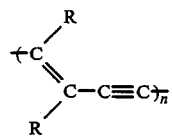

Unfortunately, polydiacetylenes are not normally readily soluble in conventional solvents, although soluble polydiacetylenes have been made from elaborate derivatives of the diacetylene monomer. In accordance with the present invention, it is necessary that the diacetylene polymer be soluble for the carboralation reaction and, thus, polydiacetylenes which can be readily soluble in conventional solvents are the most useful.

It has been found that readily soluble polydiacetylenes can be formed by heating diacetylene-diols in solvents with boiling points greater than 150° C. The starting diacetylene diols can be represented by the structural formula $R_1O—R—C\equiv C—C\equiv C—R—OR_1$ wherein R is an alkylene group of 1 to 10 carbon atoms and the two $R_1$ groups may be the same or different and can be selected from hydrogen, alkyl, aryl, acyl, or silyl. Useful solvents include aromatic solvents such as toluene, xylene, mesitylene, prehnitrene; chloroaromatic solvents such as chloronaphthalene; polyethers such as diglyme triglyme, etc. Reaction time must be such as to strike a balance between the desire to bring about a significant degree of polymerization of the diacetylene monomer and the need to readily dissolve the polymer for carboralation. Preferably, heating from about five to 150 hours at temperatures of from 150° C. to 350° C. yields polydiacetylenes of relatively low molecular weight, e.g., Mw of 1,000–10,000, and which are readily soluble in the refluxing solvents for the carbonalation reaction. Of course, suitable reaction pressure will be needed to maintain a liquid reaction medium. Carboralation proceeds as above described to yield organoboron polmers having repeating carborane and vinyl groups along the backbone thereof.

The present invention is particularly useful in the formation of boron ceramic fibers from a spinning composition comprising the organoboron preceramic polymer or a blend of boron-containing polymer and a precarbonaceous polymer. Polymer blends are particularly useful if the organoboron polymer has a low molecular weight. Any known technique for spinning the organoboron preceramic polymer into fiber may be used including melt and solvent spinning methods. While it may be possible to melt spin the organoboron polymer, most likely the organoboron polymer will have a melting point far above the melting point of a blendable precarbonaceous polymer which may be adversely effected at the temperatures required for melt spinning. Accordingly, a solvent spinning method is preferred. Thus, spinning into fibers is preferably accomplished with either the wet or dry spinning techniques. In dry spinning, the spinning composition issues from the spinning apparatus through a spinning column wherein a stream of drying gas is simultaneously fed through the spinning column. The temperature of the spinning column and that of the drying gas is dependent on the volatiles which have to be evaporated from the filament during its passage through the spinning column. In wet spinning, the spinning dope is extruded into a spin bath where coagulation of the spinning solution and the formation of the fiber occurs. A variety of suitable solvent-nonsolvent systems are known in the fiber art for use as the coagulating medium or spin bath. Suitable spin baths are nonsolvents for the polymers contained in the spinning blend and do not chemically react with the spinning solution. The fiber which is formed is typically washed to remove any adhering traces of the spin bath, and then dried.

In most cases, the solvent diluent which is employed provides the spinning composition (i.e., a spinning dope) with a room temperature viscosity range between about 0.1–3,000 poises, and preferably between about 100–1,000 poises.

Any useful solvent can be employed. Nonlimiting solvents include those for use with a water-miscible polymer and which include water and/or water-miscible solvent such as methanol, ethanol, acetic acid, dimethylformamide, tetrahydrofuran, and the like. Solvents which can be used with an oil-soluble polymer include organic solvents such as benzene, hexane, dichloroethylene, dichloroethylene, dimethylacetamide, dibutylether, ethylacetate, and the like.

If polymer blends are to be spun, the boron-containing polymers must be soluble in the solvents used to dissolve the precarbonaceous polymer and form the spinning dope or at least be soluble in solvents compatible with the precarbonaceous polymer solvents. It is preferred that the solvent for the boron-containing polymer be the same as the solvent used to dissolve the precarbonaceous polymer. It is not absolutely necessary that the solvent for the boron-containing polymer and the precarbonaceous polymer be the same as long as the solvents are compatible. Compatibility as stated herein means the solvents will form a homogenous mixture.

The concentrations of the polymeric materials in the spinning solution can vary widely and will depend for one on the particular spinning process, e.g., dry or wet which is used to form the fibers. The concentration of the boron-containing polymer is the controlling factor in solubility and, thus, for greater amounts of boron-containing polymer required, the solution will have to be less concentrated. Typically, for wet spinning, concentrations of the polymeric materials between about 5 and 20% by weight will be used whereas for dry spinning, concentrations of up to about 80% are useful. It is extremely difficult to obtain boron-containing polymer concentrations near 80% and, thus, for dry spinning, a much higher level of the precarbonaceous polymer relative to the boron-containing polymer must be utilized. In such instance, the boron content of the formed fibers will be relatively low and, thus, dry spinning is not a preferred method of forming boron carbide-fibers wherein the amount of boron relative to carbon must approach 3:1. On the other hand, the dry spinning process may be useful in forming boron nitride, boron phosphide or boron metalloid ceramic fibers inasmuch as the amount of boron-containing polymer needed is the minimum to form an intact fiber. High levels of the precarbonaceous polymer do not adversely effect the non-carbide ceramic products since the polymer is burned away and is not present as a carbon source. The amount of the precarbonaceous polymer therefore need not be controlled as in the case of the boron carbide fibers. Preferably, wet spinning is used to form the fibers since the greater amounts of solvent allow the use of a greater amount of organoboron polymer.

After a newly formed fiber is spun, it can be stretched or drawn to about 100–300% of its original length by conventional techniques.

The preceramic polymeric fiber can be converted to any one of a variety of fibrous configurations prior to undergoing thermal treatment. For example, the fiber can be in the form of filaments, staple fibers, tows, plied yarns, knits, braids, fabrics, or other fibrous assemblages while undergoing thermal treatment. Alternatively various fibrous configurations may be formed form the inorganic fibers at the conclusion of the pyrolysis step of the process.

To provide a final ceramic fiber product with optimal physical properties, it is preferred to subject the preceramic polymeric fiber from the preceramic fiber formation step to an initial thermal treatment in a molecular oxygen environment. The polymers in the preceramic fiber are partially carbonized to a stabilized form so that the subsequent pyrolysis step of the process can be effected without the concomitant destruction of the fibrous configuration. The thermal treatment step can be conducted by heating the fiber in a molecular oxygen-containing atmosphere at a temperature ranging between about 200°–600° C. The thermal treatment temperature selected is dependent upon the polymer resistance to distortion at elevated temperatures, and should not exceed the polymer melting point during at least the initial phase of the thermal treatment.

Volatile components that evolve during the thermal treatment step include water vapor and oxygen, and carbon monoxide and carbon dioxide resulting from a partial combustion of the polymers. Typically a 15-50% reduction in the weight of the fiber occurs during the thermal treatment step. It is believed that a crosslinking of carbon atoms occurs during the thermal treatment to produce a charred structure.

The thermal treatment can be performed in an auto clave by heating to the required temperature/time schedule. A continuous thermal treatment can be accomplished by the continuous passage of a fiber through a heated chamber or calcining furnace. The fibrous structure of the fiber is retained throughout the thermal treatment step. There is a tendency for the fiber to shrink while undergoing thermal treatment.

Alternatively, the preceramic fibers can be subjected to a chemical stabilization treatment before being subjected to the pyrolysis step. In a typical stabilization procedure, the dried fibers are contacted with a reactive free radical-forming agent such as diazidoformamide, which effects the desired crosslinked structure in the fiber substrate at ambient temperatures (e.g., 10°–40° C.).

In the subsequent pyrolysis step of the process, the proceramic fiber (either charred or uncharred) is subjected to a temperture between about 700°–2,500° C. (preferably about 1,100°–1,800° C.). The pyrolysis period normally will range between about 0.2–8 hours. Any pyrolysis gas can be utilized to pyrolyze the fibers. Thus, inert gases will lead to the formation of metal carbides while reactive gases including ammonia, phosphine, and metalloid-containing gases such as metal hydrides including germane, arsine, stibine, silane, etc. will lead to boron nitride, boron phosphides, and boron-metallic ceramics, respectively. Thus, if a carbide is desired, the pyrolyzation gas will be inert and the precarbonaceous polymer will be one that does not easily burn away so as to form a carbon structure which can be used for reaction. On the other hand, if the ceramic alloy is to be formed from reaction of the boron polymer and the pyrolyzing atmosphere, it may be desirable to use as the blended precarbonaceous polymer one which burns off relatively easy.

EXAMPLE I

This example describes the preparation of 4,5-carboranyl-2,3-hexyne-1,6-diol. 2,4-hexadiyne-1,6-diol purchased from Farchan Chemical was acetylated by conventional methods. The hexadiyne-diacetate (5.00 g, 25.75 mmol) and a slight excess of bis(acetonitrile) complex of decaborane (6.251 g, 30.9 mmol) were combined with 100 ml of toluene and refluxed for 16 hours. During that time approximately one equivalent of $H_2$ evolved and a very small amount a red-brown residue was encrusted inside of the flask. The filtrate was separated and stirpped of solvent leaving a tacky orange gum. The orange gum was redissolved in 250 ml of methanol and while being iced, hydrogen chloride was bubbled therethrough for 15 minutes. After reflux overnight, the methanol was stripped and the remaining red-orange paste was smeared on a Büchner filter and air-dried. The cake was redissolved in ethanol, concentrated and cooled. The carborane-diol precipitated when water was added to the ethanol syrup. The product was dried under vacuum overnight and had a melting point of 148° C.

EXAMPLE II

This example illustrates the preparation of a polyester utilizing the carboranyl-diol formed in Example I. The carboralated diol (3.0 g, 13.141 mmol) was susperided in 1 ml of toluene. When 3.5 ml of triethylamine (25 mmol) was added, the solid diol completely dissolved. Terephthaloylchloride (2.668 g, 13.141 mmol) was added and the mix was then set to reflux for 1 day. After cooling, the toluene was stripped from the golden-tan solid. The solid was redissolved in ethyl acetate and washed with 5% ammonium hydroxide, water, and brine, and dried over magnesium sulfate. After filtrtion, the solvent was removed and the solid was dried under vacuum. The solid has a melting temperatue of 95° C.

EXAMPLE III

This example illustrates the preparation of a polydiacetylene, poly (1,2-trans(diacetoxymethyl)-3,4-carboranyl-1-butene). 2,4-hexadiyne-1,6-diacetate (17.8 g, 91.7 mmol) was refluxed for four days in 100 ml toluene after which the solution turned deep red. The toluene was removed and the poly(diacetylene) was left as an intensely red oil. The oil was redissolved in 100 ml acetonitrile. Decaborane (5.6 g, 45.9 mmol) was added to the redissolved oil and the mix was set to reflux for two days. During this time, approximately 2 equivalents of $H_2$ evolved and the solution became red-brown. After removing the acetonitrile, a tacky red-brown solid was left. This tacky solid was dramatically cleaned by diethylether. The ether leached out the brown color from the solid which was left tan and flaky with a dull bronze luster. After separating off the ether wash and drawing under vacuum, the solid was a light tan, very fine powder. The powder was very soluble in acetone, insoluble in water and decomposed at greater than 250° C.

The carboralated polydiacetylene was pyrolyzed by heating to 200° C. at a rate of 6° C. per minute and held for one hour. The temperature was raised to 1100° C. at a rate of 5° C. per minute and held for two hours before cooling overnight. Elemental analysis of the pyrolyzed product showed ceramic yields of approximately 60% with boron content greater than 40%.

What is claimed is:

1. An organoboron preceramic polymer having a backbone comprised of repeating units having at least one carborane group and an acetylenic bond contained in the backbone of said polymer.

2. The preceramic polymer of claim 1 comprising a polyester formed by the condensation of a carboranyl hexyne-diol with a dicarboxylic acid.

3. The preceramic polymer of claim 1 wherein said carboranyl group and said acetylenic bond are conjugated relative to one another.

4. An organoboron preceramic polymer comprising carboralated polydiacetylene.

5. The preceramic polymer of claim 4 comprising poly(1,2-trans(diacetyloxymethyl)-3,4-carboranyl-1-2 butene).

6. The preceramic polymer of claim 4 comprising poly(1,2-trans(diol-methyl)-3,4-carboranyl-1-2 butene).

7. The preceramic polymer of claim 4, wherein said carboralated polydiacetylene has a molecular weight (Mw) of 100 to 10,000.

8. A process for producing a readily soluble polydiacetylene comprising heating a diacetylene-diol having the formula $R_1O-R-C\equiv C-C\equiv C-R-OR_1$ wherein R is an alkylene group of 1 to 10 carbon atoms and $R_1$ is the same or different and can be selected from hydrogen, alkyl, aryl, acyl, or silyl, in a solvent having a boiling point greater than 150° C. for a sufficient time to polymerize said diacetylene-diol.

9. The process of claim 8, wherein said heating is conducted for about 5 to 150 hours at temperatures of from 150° C. to 350° C. and at pressures sufficient to maintain a liquid reaction medium.

10. The process of claim 8, wherein said solvents are selected from the group consisting of aromatic solvents, chloroaromatic solvents, and polyethers.

11. The process of claim 10, wherein said aromatic solvents are selected from the group consisting of toluene, xylene, mesitylene, and prehnitrene.

12. The process of claim 8, wherein $R_1$ is acetoxy.

* * * * *